United States Patent [19]
Lumby et al.

[11] 3,780,818
[45] Dec. 25, 1973

[54] FORCE TRANSMITTING APPARATUS WITH A SINGLE LOAD CELL

[75] Inventors: Donovan H. Lumby, Minneapolis; Walter F. Sofie, St. Paul, both of Minn.

[73] Assignee: Graco Inc., Minneapolis, Minn.

[22] Filed: June 19, 1972

[21] Appl. No.: 264,083

[52] U.S. Cl. ............................................. 177/256
[51] Int. Cl. ........................................... G01g 21/08
[58] Field of Search ............... 177/210, 256–259, 177/DIG. 9

[56] References Cited
UNITED STATES PATENTS

| | | | |
|---|---|---|---|
| 3,666,032 | 5/1972 | Maffia et al. | 177/256 |
| 1,548,321 | 8/1925 | Jaenichen | 177/DIG. 9 |
| 3,164,218 | 1/1965 | McClimon | 177/210 X |
| 3,465,838 | 9/1969 | Kienzle et al. | 177/256 |
| 3,658,143 | 4/1972 | Schwartz | 177/257 X |

*Primary Examiner*—George H. Miller, Jr.
*Attorney*—Paul L. Sjoquist

[57] ABSTRACT

A force transmitting apparatus that has a generally horizontal weighing platform which transmits the weight of an object to a single load cell. Two similar spaced rigid frame structures connected to the platform by several tension members act as part of the mechanism of force transmission. The load cell itself is supported by a rigid member between two pivotal connections that may be constructed by a groove and knife edge. An overload device may also be employed on the same rigid member to prevent the cell from being subjected to loads above its upper rating. Additional pivotal mountings are used to join the rigid frame members to a supporting rigid frame structure that may be divided into two assemblies or may be one unitary assembly. A pump powered hydraulic cylinder may be used to raise the total structure with its platform and a readout unit may be used to record the force generated by an object on the platform.

9 Claims, 4 Drawing Figures

FORCE TRANSMITTING APPARATUS WITH A SINGLE LOAD CELL

BACKGROUND OF THE INVENTION

Field of the Invention:

This invention relates to a force transmission apparatus that utilizes a single load cell. More particularly, it relates to a weighing scale that transmits a vertical force to a signal load cell through a rigid frame assembly.

Force transmitting devices that employ single load cells to indicate the amount of force or weight placed on a platform are known. In none of the known prior art devices is a single load cell used to accurately and rapidly weigh an object with as few rigid structural members and connections. The sensitivity of the load cell coupled with its rapid actuation, without the normal time lags which in most weighing devices are due to oscillations of the force indicators, results in a superior apparatus that has less parts and is ideally suited for production line operations or any operation requiring a rapid and accurate indication of the weight of an object.

SUMMARY OF THE INVENTION

An object placed on a weighing platform transmits its vertical force component to a single load cell through two rigid frame assemblies pivotally connected by low friction joints to the member supporting the cell. In turn, a rigid supporting structure may be joined by a series of known friction pivot connections to the two frame assemblies.

The primary object of this invention is an improved force transmitting device.

An additional object is a precision weighing apparatus that has a single load cell with a minimum of parts.

A still further object is to construct a weighing scale ideally suited for production line operations which is simple in design and operation yet rapid and accurate.

Figure 1:
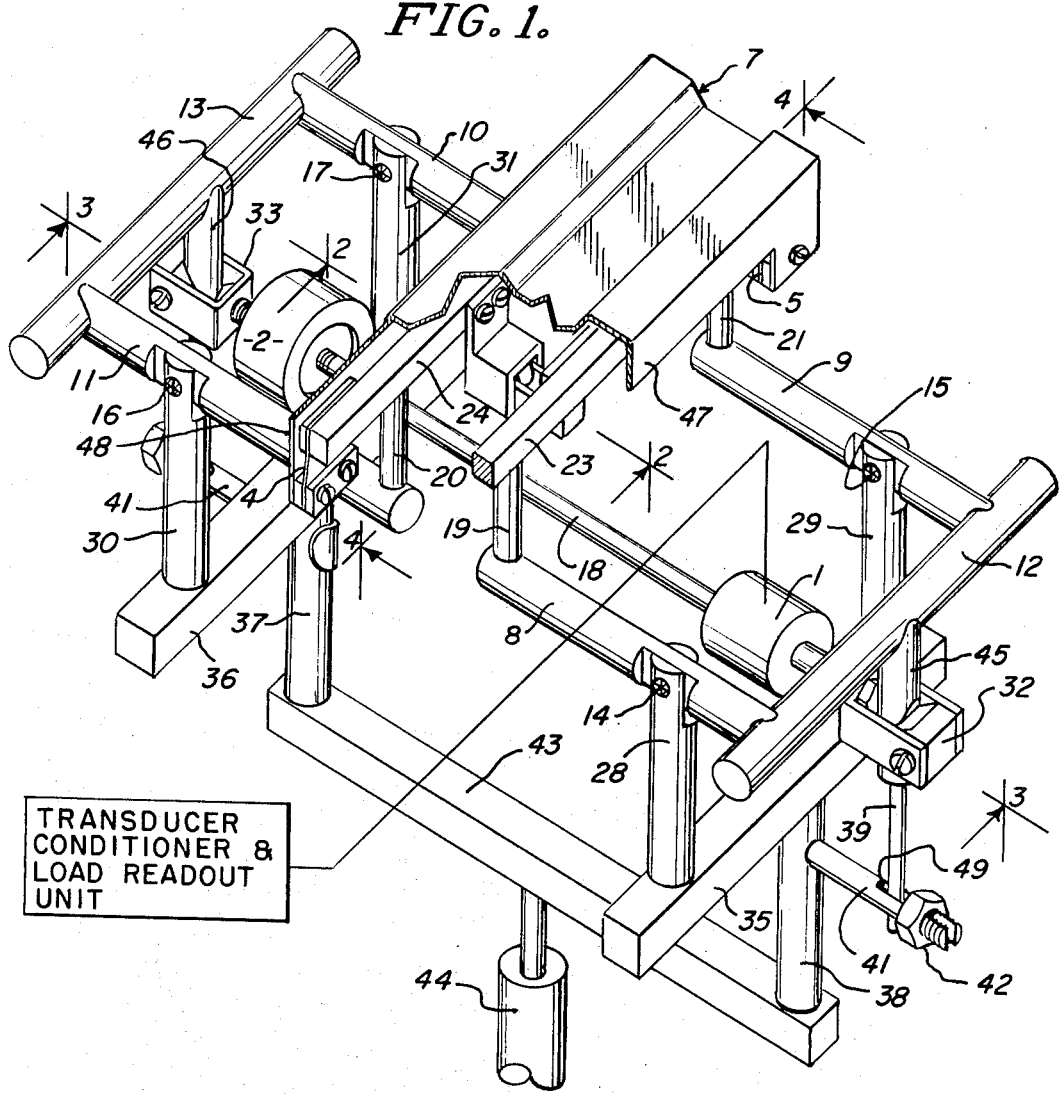
FIG. 1 represents an isometric view of a partial cut away of our invention.

FIG. 1 shows the completed force transmitting apparatus with its weighing platform 7 partially cut away. In the generally horizontal platform illustrated, a concave surface indentation runs the entire longitudinal extent of the external upper surface to act as a guide member for the object to be weighed. This specific design was adopted to fit the configuration of the shape of the object to be weighed. This happened to be a fowl whose shape fit the scale platform. The specific shape of the top surface of the weighing platform is unimportant to our invention as long as it is generally horizontal and capable of maintaining the object placed thereon.

Figure 2:
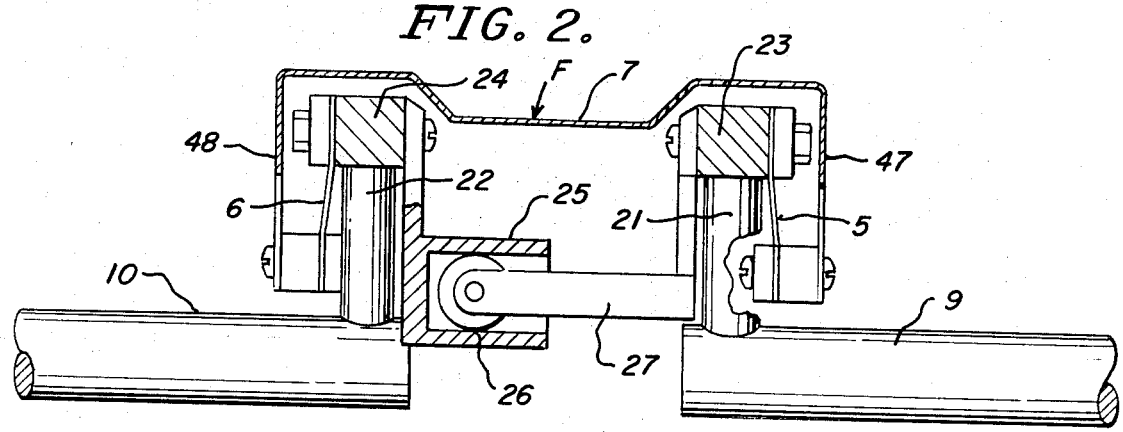
FIG. 2 is an enlarged cross-sectional front view along line 2—2 of FIG. 1 showing the weighing platform in detail.

As best shown in FIG. 2, the platform is U-shaped in its width cross section with two longitudinally extending identical depending skirt members 47 and 48 that are attached by screws to four identical thin elongated tension strap members 3, 4, 5 and 6. These band-like stainless steel tension members suspend platform 7 and allow substantially all of the object's vertical force component to act in a vertical direction as they possess little or no strength in a horizontal plane. It can be seen from FIG. 2 that these tension members are subjected to a pulling force via the skirt members as weight is placed on the platform. This force is transmitted to the horizontal legs 23 and 24 with their rigid vertical supports 19, 20, 21, and 22 that are rigidly attached to the legs and usually vertically fixed with respect to ground.

Attached to the legs 23 and 24 are three elements which act as a stabilizing linking means to prevent forces acting on the platform 7 from compressing the tension members 3, 4, 5, and 6. These elements consist of a rod 27 attached by a bracket to leg 23 with a freely moving bearing 26 loosely held at one end. The bearing acts as a wheel that rides in a horizontal guide 25 which is rigidly attached by another bracket to leg 24. When loads are placed on the platform, there would be a tendency for the platform to cause relative vertical motion between the tension-bearing members 3 to 6 due to compressive forcing acting on them. This tendency is reduced by the stabilizing means in which bearing 26 rides in its guide in a virtually friction-free manner. Usually the actual movement of this bearing would be less than an eighth of an inch unless an excessive force is placed on the platform.

The leg 23, the two vertical parallel supports 19 and 21, the two horizontal parallel members 8 and 9, and the single adjoining horizontal member 12 with its depending vertical member 45 (FIG. 3), form a rigid frame assembly. Each member is rigidly attached to its adjoining member. Each may consist of a solid metallic member or a hollow rigid member such that the force and movement of one will be transferred to or through the others.

Figure 3:
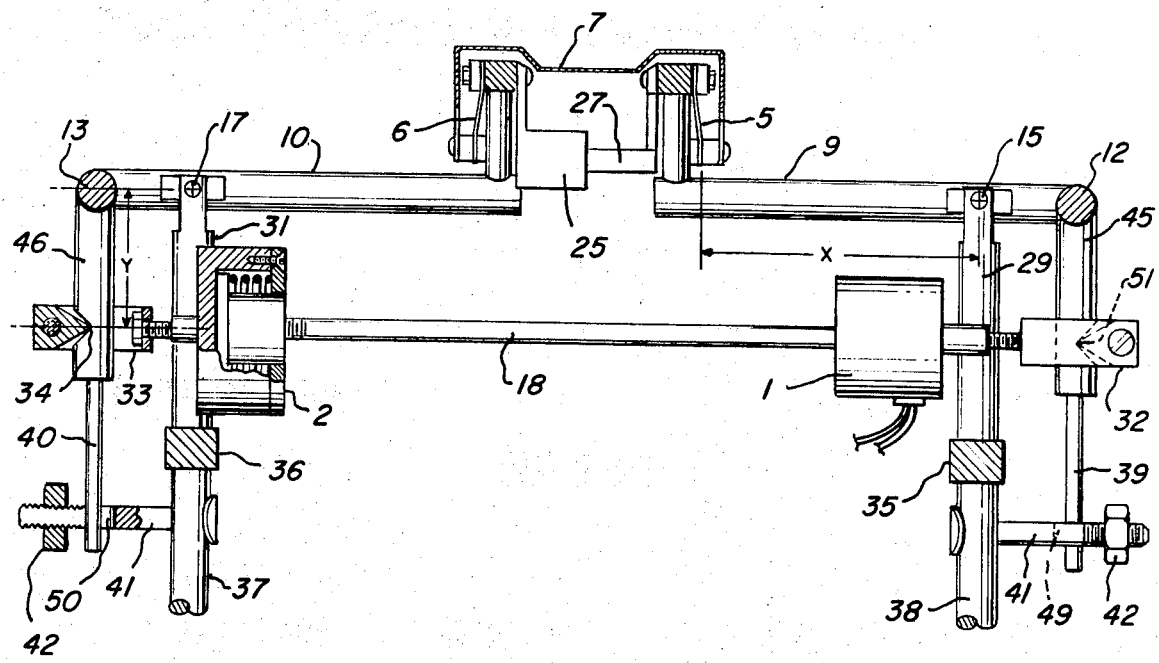
FIG. 3 is a partial cross-sectional view along line 3—3 of FIG. 1.
Figure 4:
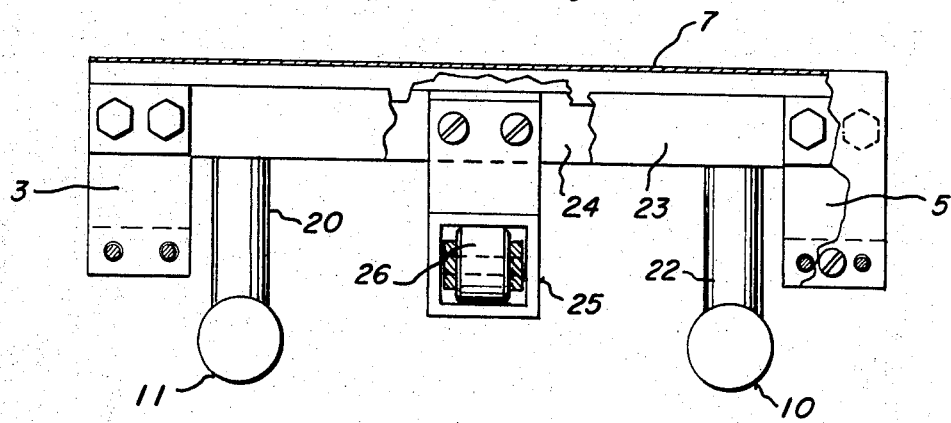
FIG. 4 is an enlarged side view partially cut away of the weighing platform along line 4—4 of FIG. 1.

The counterparts to these rigid frame members form a second substantially identical symmetrically positioned rigid frame assembly that performs in a similar manner as the first frame assembly. The second frame assembly is spaced from the first assembly and consists of the horizontal rigid leg 24, the rigid vertical parallel supports 20 and 22, rigid horizontal parallel members 10 and 11, and the adjoining rigid horizontal member 13 with its depending rigid vertical member 46 as best shown in FIG. 3.

Each of the depending members 45 and 46 have extensions 39 and 40, respectively, that are also rigidly attached to their lower ends. The extensions ride in slots 49 and 50 (FIGS. 1 and 3) in their respective identical bolts 41 with nuts 42 to limit their horizontal movement. Vertical movement of these extensions is prevented by the pivotal attachments of the parallel members 8, 9, 10 and 11 to a lower rigid grounded structure.

These four pivotal attachments, 14, 15, 16 and 17 directly attach the two spaced rigid assemblies to a lower rigid grounded supporting structure. Two pivot joints support and join each spaced rigid assembly to the supporting structure. The pivot joints have a linear degree of friction that allows predictable results to be calculated and compensated for in determining the force distribution, their friction being a predictable linear function of their angle of rotation. Hence, frictional losses at these joints can be determined as the two frame assemblies rotate relative to their underlying supporting structure.

In the preferred embodiment, the supporting frame structure has four rigid parallel vertical legs 28, 29, 30, and 31, to the upper ends of which are pivotally connected to their corresponding members 8, 9, 10, and 11, as shown in FIG. 1. The legs have lower supporting rigid horizontal members 35 and 36 (FIG. 3) to connect each group of two legs together. At approximately the center of each of the longitudinal extents of the members 35 and 36 rigid downwardly directed vertical members 38 and 37, respectively, are fixedly connected. The previously mentioned slotted bolts 41 extend through these vertical members such that they lie in a common vertical plane with the depending vertical extensions 39 and 40. The members 37 and 38 may be fixed in a support directly connected to the ground or a support that can be moved but which is otherwise fixed. They may also be joined at their lower ends by still another horizontal bar 43 as indicated in FIG. 1 or could be separated without such a bar. Regardless of the geometry of the structure, a device such as an hydraulic cylinder 44 powered by a pump may be used to move the supporting structure with attached upper platform in a vertical direction when it is desired to change the elevation of the total structure. At different levels the hydraulic cylinder would rigidly fix the support in place with respect to the ground.

The vertical depending legs 45 and 46 of the two rigid frame assemblies both have outwardly facing grooves 51 and 34 as indicated in FIG. 3. Each groove is engaged by an inwardly facing sharpened knife edged member that forms part of the encircling mounting brackets 32 and 33. These brackets are in turn attached rigidly to ends of a rigid stainless steel rod 18 by bolts or other means. Between the brackets and the ends of the supporting rod 18 are mounted the single load cell 1 and an overload release mechanism 2. It should be noted that the inward sharpened edges and their engaged respective grooves form two pivotal joints of very low predictable friction with a minimum of physical contact.

While any reliable load cell may be used, the particular load cell actually used is Model No. 3397 made by Lebow Associates of Troy, Michigan. As are most load cells, it is a device to measure changes in electrical resistance of a material by subjecting the material to force-caused strain within the elastic limits of the material. Variations in resistance are read by making the material the variable resistor of one of the four resistors in a balanced bridge network where the other three resistors have constant values. As strain is placed on the variable resistor by placing an object on platform 7, the greater the weight, the more the resistor bridge will become unbalanced. The increase in weight and hence increase in resistance, increases the voltage reading across the variable resistor. This increase in voltage is, within certain defined limits, directly proportional to the weight of an object. By feeding the output voltage to a transducer conditioner and load readout unit (FIG. 1) an indication of the force or weight can be rapidly and accurately obtained. A transducer digital indicator such as Model 7510 of Lebow Associates may be used for this purpose.

Once the weight of the object is ascertained, it may be fed to an electronic control system as a programmable number to control the actuation of a fluid metering system. It could also be just visually displayed, printed on a readout sheet, or otherwise used as a control signal to control the operation of some electronic device.

Mounted on the same rod 18 opposite the load cell is an overload release mechanism 2. Basically, this safety device is a spring preset to be actuated when the force on the load cell exceeds an upper limit to prevent damage to the cell. In the particular cell used, a range of 0 to ± 100 pounds of force was used. Thus, as soon as the force exceeds 100 pounds of strain, the length of the spring in the overload release 2 would be actuated to expand the distance between legs 45 and 46.

Two distances X and Y are indicated on the drawings (FIG. 3) with X being about twice the length of Y. The Y distance is measured vertically from a line passing through the apex of the knife edges of brackets 32 and 33 to the middle of a line passing through horizontal bars 12 and 13, respectively. The horizontal X distance is measured from the middle of the bottom of the tension member 5 to the pivot pin of pivot joint 15. By choosing this particular X to Y relationship, the force impressed on the load cell is made a multiple of the weight of the object on the platform. In the example, twice the load would be impressed on the cell since the ratio of X to Y is 2:1.

The invention consists of a few basic components, namely: the weighing platform, two similar rigid frame assemblies, a single load cell supporting device, a rigid supporting structure for the foregoing, and several pivotal joints. In the preferred embodiment shown, four similar pivotal joints (14 . . . 17) with predictable frictional characteristics are shown to join the upper two rigid frame assemblies to their supporting lower rigid structure. It should be apparent that two of these frame-joining pivotal joints (14 . . . 17) could be eliminated, however, stability considerations would normally dictate otherwise. There are also two other pivotal joints (edges of members 32 and 33 and grooves 51 and 34) to connect the load cell supporting structure to each of the depending legs of the rigid frame assemblies. By changing the orientation of the load cell structure to a generally vertical disposition from its generally horizontal disposition, one of the load cell pivots formed by members 32 and 33 and grooves 51 and 34 could conceivably be eliminated. Further, the grooves and knife edges could be interchanged so that the depending legs 45 and 46 have the knife edges and the brackets 32 and 33 have the grooves.

The operation of the invention is straight forward. The load of the object represented by F in FIG. 2 is placed on the platform 7 either manually or as it leaves a conveyor system. The weight of force from the load is transmitted to the tension members 3 to 6. This results in downward components of force on the spaced frame assemblies starting with their horizontal rods 23 and 24. This component is then distributed to the pivotal joints that join the frames to the main support frame and as a result tends to slightly lift the depending legs 45 and 46 upwardly and outwardly. When these legs and their brackets 32 and 33 pivot in an upward and outward direction, a strain is placed on the load cell supports through the two knife edges of brackets 32 and 33. This strain pulls outwardly in opposite directions on both ends of bar 18 to strain the metal resistor in the load cell as mentioned previously. As long as the force on the load cell is within the limits of its rating, an accurate signal will be transmitted by the connecting wire to the readout unit. Should the load cell range be exceeded, the preset overload member 2 will be actuated to prevent damage to the cell.

Should this invention be used in the food-handling industry, most - - if not all - - of the frame assembly members, the platform, the rod 18, the supporting frame, the members 25, 26, and 27, and other parts could be made of stainless steel to allow easy cleaning. The rigid members could be hollowed to reduce weight or could be made of solid material. None of these variations, any of the heretofore mentioned ones, any equivalents that may be used, or any uses the object may be subjected to before or after it is weighed effect the scope of our invention which is measured only by the features stated in the following claims.

We Claim:

1. A force-transmitting apparatus comprising: a generally horizontal weighing platform;
   a single load cell actuated by horizontal forces and supported between two pivotal connections;
   two spaced rigid frame assemblies to support said platform, one of which is connected to each of said two pivotal connections; and rigid supporting means to support said two rigid frame members by two pivotal connections for each of said frame members.

2. The apparatus of claim 1 wherein said rigid supporting means is operably engaged by means to move said supporting means in a vertical direction.

3. The apparatus of claim 1 wherein each of said two pivotal connections supporting said load cell comprise a mounting bracket with a sharpened edged member to engage a groove in each of said rigid frame assemblies.

4. The apparatus of claim 3 wherein said load cell is mounted on a rigid elongated bar between its pivotal connections and an overload release means is also mounted on said bar.

5. A force-transmitting and measuring apparatus comprising:
   a generally horizontal platform adapted to receive an object to be weighed;
   first and second similar rigid frame assemblies spaced from each other supporting said platform to transmit the vertical load forces of the object placed thereon;
   a supporting third rigid frame assembly for supporting said first and second assemblies;
   a plurality of first pivotal joints to pivotally connect each of said first and second frame assemblies to said third assembly;
   a single load cell having an output signal representative of the load forces on the cell, said cell connected between said first assembly and said second assembly by elongated members extending therebetween, said elongated members coupled to each of said first and second assemblies by a sharpened knife-edge bearing against said assemblies to transfer the horizontal component of relative motion between said first and second assemblies to said load cell.

6. The apparatus of claim 5 further comprising a preset overload member connected in series with said load cell on one of said elongated members, said overload member acting to disengage load cell forces exceeding said preset amount to prevent excess forces from being placed on said load cell.

7. The apparatus of claim 5 wherein the first and second rigid frame assemblies each further comprise a horizontal member and a vertical member, with said pivoted joints connected to said horizontal member and said elongated members' sharpened edges bearing against said vertical members.

8. The apparatus of claim 7 wherein said vertical members further comprise a grooved portion for receiving said elongated member sharpened edge.

9. The apparatus of claim 7 further comprising means for converting and displaying said load cell output signal as a quantity representative of the weight of the object being weighed.

* * * * *